(12) United States Patent
Deng et al.

(10) Patent No.: US 11,368,909 B2
(45) Date of Patent: *Jun. 21, 2022

(54) DATA TRANSMISSION METHOD AND APPARATUS

(71) Applicant: HUAWEI TECHNOLOGIES CO., LTD., Guangdong (CN)

(72) Inventors: Qiang Deng, Shenzhen (CN); Wanqiang Zhang, Beijing (CN); Zhenglei Huang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 55 days.

This patent is subject to a terminal disclaimer.

(21) Appl. No.: 16/858,340

(22) Filed: Apr. 24, 2020

(65) Prior Publication Data

US 2020/0260383 A1 Aug. 13, 2020

Related U.S. Application Data

(63) Continuation of application No. 15/963,852, filed on Apr. 26, 2018, now Pat. No. 10,674,448, which is a (Continued)

(51) Int. Cl.
*H04W 52/02* (2009.01)
*H04W 8/24* (2009.01)
(Continued)

(52) U.S. Cl.
CPC ......... *H04W 52/0229* (2013.01); *H04W 8/24* (2013.01); *H04W 52/02* (2013.01);
(Continued)

(58) Field of Classification Search
CPC ............. H04W 52/02; H04W 52/0209; H04W 52/0216; H04W 52/0225; H04W 52/0229;
(Continued)

(56) References Cited

U.S. PATENT DOCUMENTS 9,504,012 B1 11/2016 Ljung et al.
9,730,156 B1 * 8/2017 Chamarty ............... H04L 67/16
(Continued)

FOREIGN PATENT DOCUMENTS

CN 102300283 A 12/2011
CN 103458505 A 12/2013
(Continued)

OTHER PUBLICATIONS

3GPP TS 23.401 V13.4.0 (Sep. 2015);3rd Generation Partnership Project;Technical Specification Group Services and System Aspects;General Packet Radio Service (GPRS) enhancements for Evolved Universal Terrestrial Radio Access Network (E-UTRAN) access(Release 13),total 334 pages.
(Continued)

*Primary Examiner* — Kevin D Mew

(57) ABSTRACT

A data transmission method provided in embodiments of the present application includes: determining, by a mobility management entity MME, that user equipment UE changes from an unreachable state to a reachable state; sending, by the MME, a request message to a serving gateway SGW; receiving, by the MME, downlink data sent by the SGW; and sending, by the MME, the downlink data to the UE. In this way, when the UE changes to a reachable state for downlink data, the MME requests the SGW to send the downlink data, and the MME then sends the downlink data to the UE, thereby avoiding loss of the downlink data caused by delivery of the downlink data to the UE that is in an unreachable state, and improving real-time accuracy of transmission.

15 Claims, 7 Drawing Sheets

Related U.S. Application Data continuation of application No. PCT/CN2015/093025, filed on Oct. 28, 2015.

(51) Int. Cl.
　　*H04W 88/16* (2009.01)
　　*H04W 88/14* (2009.01)

(52) U.S. Cl.
　　CPC ........ *H04W 52/0216* (2013.01); *H04W 88/14* (2013.01); *H04W 88/16* (2013.01); *Y02D 30/70* (2020.08)

(58) Field of Classification Search
　　CPC ......... H04W 8/22; H04W 8/24; H04W 8/245; H04W 88/08; H04W 88/14; H04W 88/16; Y02D 30/70
　　See application file for complete search history.

(56) References Cited

U.S. PATENT DOCUMENTS

| | | | |
|---|---|---|---|
| 10,306,596 B2 * | 5/2019 | Baghel | H04W 12/03 |
| 10,405,252 B2 * | 9/2019 | Engstrom | H04W 36/32 |
| 2012/0063464 A1 | 3/2012 | Mehta | |
| 2012/0264443 A1 | 10/2012 | Ng et al. | |
| 2013/0039287 A1 * | 2/2013 | Rayavarapu | H04W 72/042 370/329 |
| 2013/0039339 A1 * | 2/2013 | Rayavarapu | H04W 76/19 370/331 |
| 2013/0260811 A1 * | 10/2013 | Rayavarapu | H04W 76/19 455/509 |
| 2014/0064124 A1 | 3/2014 | Paladugu et al. | |
| 2014/0198637 A1 * | 7/2014 | Shan | H04W 52/244 370/229 |
| 2014/0341041 A1 * | 11/2014 | Velev | H04W 4/70 370/236 |
| 2015/0117285 A1 * | 4/2015 | Xie | H04W 52/0209 370/311 |
| 2015/0139054 A1 | 5/2015 | Wu et al. | |
| 2015/0358954 A1 | 12/2015 | Koshimizu et al. | |
| 2016/0021639 A1 | 1/2016 | Ma et al. | |
| 2016/0044578 A1 * | 2/2016 | Vajapeyam | H04W 24/08 370/252 |
| 2016/0050713 A1 | 2/2016 | Kim et al. | |
| 2016/0191382 A1 | 6/2016 | Guo et al. | |
| 2016/0205625 A1 * | 7/2016 | Stojanovski | H04W 52/0212 370/311 |
| 2016/0262041 A1 | 9/2016 | Nneke et al. | |
| 2016/0269942 A1 | 9/2016 | Olsson et al. | |
| 2016/0323845 A1 * | 11/2016 | Kim | H04W 68/005 |
| 2016/0330686 A1 | 11/2016 | Wu et al. | |
| 2016/0345262 A1 * | 11/2016 | Jain | H04W 68/12 |
| 2017/0150445 A1 | 5/2017 | Ma et al. | |
| 2017/0164286 A1 | 6/2017 | Jeong et al. | |
| 2017/0272990 A1 | 9/2017 | Mutikainen et al. | |
| 2018/0242246 A1 | 8/2018 | Ryu et al. | |

FOREIGN PATENT DOCUMENTS

| | | |
|---|---|---|
| CN | 104205953 A | 12/2014 |
| WO | 2011154761 A1 | 12/2011 |
| WO | 2014166030 A1 | 10/2014 |
| WO | 2015032037 A1 | 3/2015 |
| WO | 2015065457 A1 | 5/2015 |

OTHER PUBLICATIONS

3GPP TR 23.887 V12.0.0 (Dec. 2013);3rd Generation Partnership Project;Technical Specification Group Services and System Aspects;Study on Machine-Type Communications (MTC) and other mobile data applications communications enhancements(Release 12),total 151 pages.

3GPP TR 33.868 V0.14.0(Jul. 2013), 3rd Generation Partnership Project; Technical Specification Group Radio Access Network; Security aspects of Machine-Type and other Mobile Data Application Communications Enhancements; Release 12, 107 pages.

* cited by examiner

DATA TRANSMISSION METHOD AND APPARATUS

CROSS-REFERENCE TO RELATED APPLICATIONS

This application is a continuation of U.S. patent application Ser. No. 15/963,852, filed on Apr. 26, 2018, which is a continuation of International Application No. PCT/CN2015/093025, filed on Oct. 28, 2015. The afore-mentioned patent applications are hereby incorporated by reference in their entirety.

TECHNICAL FIELD

The present application relates to the communications field, and in particular, to a data transmission method and an apparatus.

BACKGROUND

A difference from conventional user equipment (UE) applications is that many machine to machine (M2M) applications only receive and send small data. The small data usually is only several or tens of bytes. For example, M2M devices of a water meter and a power meter only need to exchange some small data with an application server. If a user plane bearer is established to transmit only the small data, network resources are wasted. The third Generation Partnership Project (3GPP) researches how to efficiently transmit small data on a premise that network resources are saved. One method is transmitting small data by using a non-access stratum (NAS) message of a control plane. The method avoids signaling overheads for establishing a user plane and is an effective small data transmission method.

To save power, some power saving technologies such as a power saving mode (PSM) and extended discontinuous reception (eDRX) are used in an M2M device. When a power saving function is enabled on the M2M device, the M2M device is temporarily in an unreachable state, and downlink data cannot be sent to the M2M device. For an M2M device using a power saving function, how to effectively transmit downlink small data is an issue that needs to be resolved.

The foregoing method for transmitting small data using NAS in the prior art is performed only when UE is reachable, and how to transmit downlink small data when UE uses a power saving technology and is temporarily in an unreachable state is not considered. When the UE uses a power saving technology and is in an unreachable state, the UE cannot receive downlink small data, thereby causing loss of the downlink small data.

SUMMARY

In view of this, the present application provides a data transmission method and an apparatus for avoiding loss of downlink data.

A first aspect of embodiments of the present application provides a data transmission method, including:
determining, by a mobility management entity MME, that user equipment UE changes from an unreachable state to a reachable state;
sending, by the MME, a request message to a serving gateway SGW;
receiving, by the MME, downlink data sent by the SGW; and
sending, by the MME, the downlink data to the UE.

With reference to the first aspect of the embodiments of the present application, in a first implementation of the first aspect of the embodiments of the present application, the MME includes an original MME and a new MME, and when the original MME serving the UE is switched to the new MIME, the sending, by the MIME, a request message to a serving gateway SGW includes: sending, by the original MME, the request message to the SGW;
the receiving, by the MME, downlink data sent by the SGW includes: receiving, by the original MME, the downlink data sent by the SGW;
the method further includes: sending, by the original MME, the downlink data to the new MME; and
the sending, by the MIME, the downlink data to the UE includes: sending, by the new MIME, the downlink data to the UE.

With reference to the first aspect of the embodiments of the present application, in a second implementation of the first aspect of the embodiments of the present application, the MIME includes an original MIME and a new MME, and when the original MIME serving the UE is switched to the new MME, the sending, by the MME, a request message to a serving gateway SGW includes: sending, by the new MME, the request message to the SGW;
the receiving, by the MME, downlink data sent by the SGW includes: receiving, by the new MME, the downlink data sent by the SGW; and
the sending, by the MME, the downlink data to the UE includes: sending, by the new MME, the downlink data to the UE.

With reference to any one of the first aspect of the embodiments of the present application, the first implementation of the first aspect, or the second implementation of the first aspect, in a third implementation of the first aspect of the embodiments of the present application, the determining, by a mobility management entity MME, that user equipment UE changes from an unreachable state to a reachable state includes:
receiving, by the MME, a non-access stratum NAS message sent by the UE, and determining that the UE is in a reachable state.

With reference to any one of the first aspect of the embodiments of the present application, the first implementation of the first aspect, or the second implementation of the first aspect, in a fourth implementation of the first aspect of the embodiments of the present application, before the sending, by the MME, the request message to the SGW, the method further includes:
when the MIME determines that the UE changes from an unreachable state to a reachable state, paging, by the MME, the UE; and
receiving, by the MME, a service request message sent by the UE.

With reference to any one of the first aspect of the embodiments of the present application, the first implementation of the first aspect, the second implementation of the first aspect, the third implementation of the first aspect, or the fourth implementation of the first aspect, in a fifth implementation of the first aspect of the embodiments of the present application, before the determining, by the MME, that UE changes from an unreachable state to a reachable state, the method further includes:
determining, by the MME, that the UE is in an unreachable state, and sending, by the MME, a response message to the SGW, where the response message is used to instruct the SGW to cache the downlink data.

With reference to the fifth implementation of the first aspect of the embodiments of the present application, in a sixth implementation of the first aspect of the embodiments of the present application, the response message further includes a cache expiration time, and the cache expiration time is used to indicate an expiration time of caching the downlink data by the SGW.

With reference to any one of the first aspect of the embodiments of the present application, the first implementation of the first aspect, the second implementation of the first aspect, the third implementation of the first aspect, the fourth implementation of the first aspect, or the fifth implementation of the first aspect, in a seventh implementation of the first aspect of the embodiments of the present application, the sending, by the MIME, the request message to the SGW includes:

determining, by the MME, that the downlink data is not expired, and sending, by the MME, the request message to the SGW.

A second aspect of the embodiments of the present application provides a data transmission method, including:

receiving, by a mobility management entity MME, a downlink data notification message sent by a serving gateway SGW, where the notification message includes downlink data to be sent to user equipment UE;

determining, by the MME, that the UE is in an unreachable state, and caching, by the MME, the downlink data; and when the UE changes to a reachable state, sending, by the MME, the downlink data to the UE.

With reference to the second aspect of the embodiments of the present application, in a first implementation of the second aspect of the embodiments of the present application, after the caching, by the MME, the downlink data, the method further includes:

setting, by the MME, a cache expiration time of the downlink data.

With reference to the second aspect of the embodiments of the present application or the first implementation of the second aspect, in a second implementation of the second aspect of the embodiments of the present application, the sending, by the MME, the downlink data to the UE includes:

determining, by the MME, that the downlink data is not expired, and sending, by the MME, the downlink data to the UE.

With reference to any one of the second aspect of the embodiments of the present application, the first implementation of the second aspect, or the second implementation of the second aspect, in a third implementation of the second aspect of the embodiments of the present application, the MME includes an original MME and a new MME, and when the original MME serving the UE is switched to the new MME, the sending, by the MME, the downlink data to the UE includes:

sending, by the original MME, the downlink data to the new MME; and sending, by the new MME, the downlink data to the UE.

With reference to any one of the second aspect of the embodiments of the present application, the first implementation of the second aspect, the second implementation of the second aspect, or the third implementation of the second aspect, in a fourth implementation of the second aspect of the embodiments of the present application, before the sending, by the MME, the downlink data to the UE, the method further includes:

receiving, by the MME, a non-access stratum NAS message sent by the UE, and determining that the UE is in a reachable state.

With reference to any one of the second aspect of the embodiments of the present application, the first implementation of the second aspect, the second implementation of the second aspect, or the third implementation of the second aspect, in a fifth implementation of the second aspect of the embodiments of the present application, before the sending, by the MME, the downlink data to the UE, the method further includes:

determining, by the MME, that the UE changes to a reachable state, and paging, by the MME, the UE; and receiving, by the MME, a service request message sent by the UE.

With reference to any one of the second aspect of the embodiments of the present application, the first implementation of the second aspect, the second implementation of the second aspect, the third implementation of the second aspect, the fourth implementation of the second aspect, or the fifth implementation of the second aspect, in a sixth implementation of the second aspect of the embodiments of the present application, after the caching, by the MME, the downlink data, the method further includes:

sending, by the MME, an indication message to the SGW, to indicate that the downlink data is cached.

With reference to sixth implementation of the second aspect of the embodiments of the present application, in a seventh implementation of the second aspect of the embodiments of the present application, the indication message further includes a cache expiration time of the downlink data.

A third aspect of the embodiments of the present application provides a data transmission method, including:

receiving, by a serving gateway SGW, downlink data to be sent to user equipment UE;

sending, by the SGW, a downlink data notification message to a mobility management entity MIME;

receiving, by the SGW, a cache indication sent by the MME;

caching, by the SGW, the downlink data according to the cache indication;

receiving, by the SGW, a request message sent by the MME; and sending, by the SGW, the downlink data to the MIME according to the request message, so that the MIME sends the downlink data to the UE.

With reference to the third aspect of the embodiments of the present application, in a first implementation of the third aspect of the embodiments of the present application, the cache indication further includes a cache expiration time; and after the caching, by the SGW, the downlink data according to the cache indication, the method further includes:

setting, by the SGW, a cache expiration time of the downlink data according to the cache indication.

A fourth aspect of the embodiments of the present application provides a data transmission method, including:

receiving, by a mobility management entity MME, a reachability event configured by an application server, where the reachability event is used to indicate, by the MIME, to the application server that user equipment UE is in a reachable state;

receiving, by the MME, a non-access stratum NAS message sent by the UE, and determining that the UE is in a reachable state; or when the MIME determines that the UE changes to a reachable state, paging, by the MME, the UE, and receiving a service request message initiated by the UE;

sending, by the MME, a reachability event report of the UE to the application server;

receiving, by the MME, downlink data from the application server; and sending, by the MME, the downlink data to the UE.

With reference to the fourth aspect of the embodiments of the present application, in a first implementation of the fourth aspect of the embodiments of the present application, the receiving, by the MME, downlink data sent by the application server includes:

receiving, by the MME by using a serving gateway SGW, the downlink data sent by the application server.

A fifth aspect of the embodiments of the present application provides a mobility management entity MME, including:

a processing module, configured to determine that user equipment UE changes from an unreachable state to a reachable state;

a sending module, configured to send a request message to a serving gateway SGW; and a receiving module, configured to receive downlink data sent by the SGW, where the sending module is further configured to send the downlink data to the UE.

With reference to the fifth aspect of the embodiments of the present application, in a first implementation of the fifth aspect of the embodiments of the present application, the MIME includes an original MME and a new MME, and when the original MME serving the UE is switched to the new MME, the sending module is specifically configured for the original MIME to send the request message to the SGW;

the receiving module is specifically configured for the original MIME to receive the downlink data sent by the SGW;

the sending module is further configured for the original MIME to send the downlink data to the new MME; and the sending module is further configured for the new MIME to send the downlink data to the UE.

With reference to the fifth aspect of the embodiments of the present application, in a second implementation of the fifth aspect of the embodiments of the present application, the MIME includes an original MIME and a new MME, and when the original MIME serving the UE is switched to the new MME, the sending module is specifically configured for the new MIME to send the request message to the SGW;

the receiving module is specifically configured for the new MIME to receive the downlink data sent by the SGW; and the sending module is further configured for the new MIME to send the downlink data to the UE.

With reference to any one of the fifth aspect of the embodiments of the present application, the first implementation of the fifth aspect, or the second implementation of the fifth aspect, in a third implementation of the fifth aspect of the embodiments of the present application, the processing module is specifically configured to:

when a non-access stratum NAS message sent by the UE is received, determine that the UE is in a reachable state.

With reference to any one of the fifth aspect of the embodiments of the present application, the first implementation of the fifth aspect, or the second implementation of the fifth aspect, in a fourth implementation of the fifth aspect of the embodiments of the present application, the sending module is further configured to:

before sending the request message to the SGW, when it is determined that the UE changes from an unreachable state to a reachable state, page the UE; and the receiving module is further configured to receive a service request message sent by the UE.

With reference to any one of the fifth aspect of the embodiments of the present application, the first implementation of the fifth aspect, the second implementation of the fifth aspect, the third implementation of the fifth aspect, or the fourth implementation of the fifth aspect, in a fifth implementation of the fifth aspect of the embodiments of the present application, the sending module is further configured to:

before it is determined that the UE changes from an unreachable state to a reachable state, when it is determined that the UE is in an unreachable state, send a response message to the SGW, where the response message is used to instruct the SGW to cache the downlink data.

With reference to the fifth implementation of the fifth aspect of the embodiments of the present application, in a sixth implementation of the fifth aspect of the embodiments of the present application, the response message further includes a cache expiration time, and the cache expiration time is used to indicate an expiration time of caching the downlink data by the SGW.

With reference to any one of the fifth aspect of the embodiments of the present application, the first implementation of the fifth aspect, the second implementation of the fifth aspect, the third implementation of the fifth aspect, the fourth implementation of the fifth aspect, or the fifth implementation of the fifth aspect, in a seventh implementation of the fifth aspect of the embodiments of the present application, the sending module is specifically further configured to:

when it is determined that the downlink data is not expired, send the request message to the SGW.

A sixth aspect of the embodiments of the present application provides a mobility management entity MME, including:

a receiving module, configured to receive a downlink data notification message sent by a serving gateway SGW, where the notification message includes downlink data to be sent to user equipment UE;

a processing module, configured to determine that the UE is in an unreachable state;

a storage module, configured to cache the downlink data when it is determined that the UE is in an unreachable state; and a sending module, configured to send the downlink data to the UE when the UE changes to a reachable state.

With reference to the sixth aspect of the embodiments of the present application, in a first implementation of the sixth aspect of the embodiments of the present application, the processing module is further configured to:

set a cache expiration time of the downlink data after the downlink data is cached.

With reference to the sixth aspect or the first implementation of the sixth aspect of the embodiments of the present application, in a second implementation of the sixth aspect of the embodiments of the present application, the sending module is specifically configured to:

when it is determined that the downlink data is not expired, send the downlink data to the UE.

With reference to any one of the sixth aspect of the embodiments of the present application, the first implementation of the sixth aspect, or the second implementation of the sixth aspect, in a third implementation of the sixth aspect of the embodiments of the present application, the MIME includes an original MME and a new MME, and when the original MME serving the UE is switched to the new MME, the sending module is specifically configured to:

for the original MME, send the downlink data to the new MME; and for the new MME, send the downlink data to the UE.

With reference to any one of the sixth aspect of the embodiments of the present application, the first implementation of the sixth aspect, the second implementation of the sixth aspect, or the third implementation of the sixth aspect, in a fourth implementation of the sixth aspect of the embodiments of the present application, the processing module is specifically configured to:

when a non-access stratum NAS message sent by the UE is received, determine that the UE is in a reachable state.

With reference to any one of the sixth aspect of the embodiments of the present application, the first implementation of the sixth aspect, the second implementation of the sixth aspect, or the third implementation of the sixth aspect, in a fifth implementation of the sixth aspect of the embodiments of the present application, the sending module is further configured for the MME to:

before the downlink data is sent to the UE, when it is determined that the UE changes to a reachable state, page the UE; and the receiving module is further configured to receive a service request message sent by the UE.

With reference to any one of the sixth aspect of the embodiments of the present application, the first implementation of the sixth aspect, the second implementation of the sixth aspect, the third implementation of the sixth aspect, the fourth implementation of the sixth aspect, or the fifth implementation of the sixth aspect, in a sixth implementation of the sixth aspect of the embodiments of the present application, the sending module is further configured to:

after the downlink data is cached, send an indication message to the SGW, to indicate that the downlink data is cached.

With reference to sixth implementation of the sixth aspect of the embodiments of the present application, in a seventh implementation of the sixth aspect of the embodiments of the present application, the indication message further includes a cache expiration time of the downlink data.

A seventh aspect of the embodiments of the present application provides a serving gateway SGW, including:

a receiving module, configured to receive downlink data to be sent to user equipment UE;

a sending module, configured to send a downlink data notification message to a mobility management entity MME, where the receiving module is further configured to receive a cache indication sent by the MME;

a storage module, configured to cache the downlink data according to the cache indication, where the receiving module is further configured to receive a request message sent by the MME, and the sending module is further configured to send the downlink data to the MME according to the request message, so that the MIME sends the downlink data to the UE; and a processing module, configured to instruct the storage module to cache the downlink data.

With reference to the seventh aspect of the embodiments of the present application, in a first implementation of the seventh aspect of the embodiments of the present application, the cache indication further includes a cache expiration time; and the processing module is further configured to:

set a cache expiration time of the downlink data according to the cache indication after the downlink data is cached according to the cache indication.

An eighth aspect of the embodiments of the present application provides a mobility management entity MME, including:

a receiving module, configured to receive a reachability event configured by an application server, where the reachability event is used to indicate, by the MIME, to the application server that user equipment UE is in a reachable state, where the receiving module is further configured to: receive a non-access stratum NAS message sent by the UE, and determine that the UE is in a reachable state; or when it is determined that the UE changes to a reachable state, page the UE, and receive a service request message initiated by the UE;

a sending module, configured to send a reachability event report of the UE to the application server, where the receiving module is further configured to receive downlink data from the application server; and the sending module is further configured to send the downlink data to the UE; and a processing module, configured to determine a state of the UE.

With reference to the eighth aspect of the embodiments of the present application, in a first implementation of the eighth aspect of the embodiments of the present application, the receiving module is specifically configured to:

receive, by using a serving gateway SGW, the downlink data sent by the application server.

The data transmission method provided in the embodiments of the present application includes: determining, by a mobility management entity MME, that user equipment UE changes from an unreachable state to a reachable state; sending, by the MME, a request message to a serving gateway SGW; receiving, by the MME, downlink data sent by the SGW; and sending, by the MME, the downlink data to the UE. In this way, when the UE changes to a reachable state for the downlink data, the MIME requests the SGW to send the downlink data, and the MME then sends the downlink data to the UE, thereby avoiding loss of the downlink data caused by delivery of the downlink data to the UE that is in an unreachable state, and improving real-time accuracy of transmission.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The embodiments of the present application provide a data transmission method and an apparatus, so as to avoid loss of downlink data.

The following clearly describes the technical solutions in the embodiments of the present application with reference to the accompanying drawings in the embodiments of the present application. Apparently, the described embodiments are merely some but not all of the embodiments of the present application. All other embodiments obtained by a person skilled in the art based on the embodiments of the present application without creative efforts shall fall within the protection scope of the present application.

Figure 1:
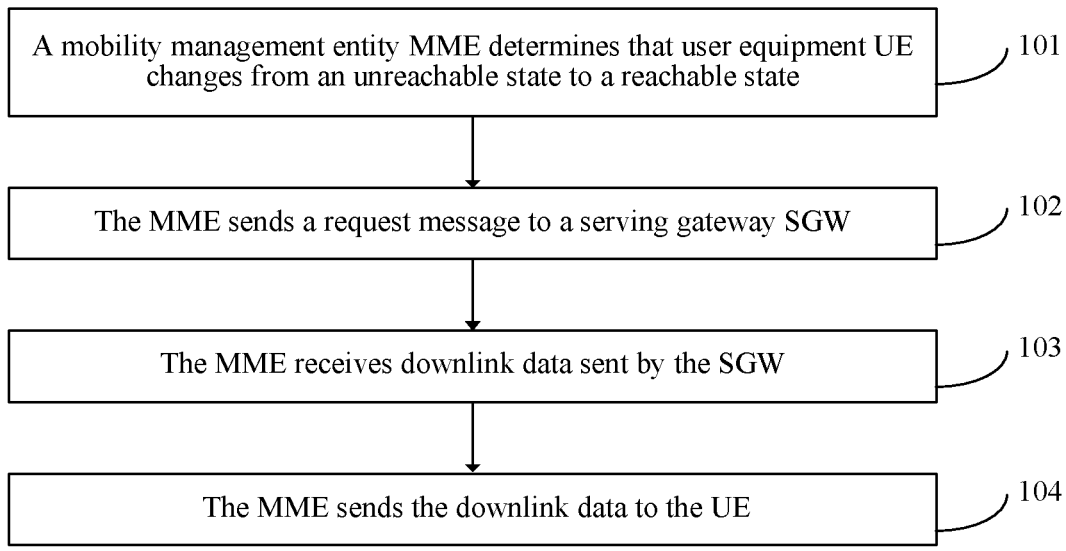
FIG. 1 is a schematic diagram of a data transmission method according to an embodiment of the present application.

Referring to FIG. 1, an embodiment of a data transmission method in the embodiments of the present application includes the following steps.

101: A mobility management entity MME determines that user equipment UE changes from an unreachable state to a reachable state.

When the user equipment UE is in an unreachable state, the UE cannot receive downlink data sent to the UE. For example, when a machine to machine (M2M) device is in a power saving state, that is, the M2M device is in an unreachable state, in this case, the device is not connected to any network side device. Therefore, when the network side sends downlink data to the M2M device, the downlink data gets lost. When the UE is in a reachable state, that is, a connection is established between the UE and a network side device, in this case, the UE can receive downlink data sent by the network side device. Because the MME in the network side device has a function of supporting monitoring within a legal scope, the MME monitors a state of the UE in real time.

102: The MME sends a request message to a serving gateway SGW.

When the MME detects that the UE changes from an unreachable state to a reachable state, downlink data can be sent to the UE. The downlink data may be sent by an application server or may be sent by another core network device. No matter who initially sends the downlink data, the downlink date needs to be forwarded by the SGW. Generally, if the UE stays in a reachable state, that is, can directly establish a connection to the SGW, when the downlink data is delivered to the SGW, the SGW can directly forward the downlink data to the UE. However, when the UE is in an unreachable state, that is, is disconnected from the SGW, the SGW cannot send the downlink data to the UE. Even if the UE changes from an unreachable state to a reachable state, the SGW cannot know the state of the UE. Therefore, the MME needs to obtain the downlink data from the SGW, so that the MME can send the downlink data to the UE. To obtain the downlink data, the MME sends the request message to the SGW, to request the SGW to send the downlink data to the MME.

103: The MME receives downlink data sent by the SGW.

After receiving the request message sent by the MME, the SGW sends the downlink data to the MME. It should be noted that the downlink data may be stored by the SGW. Alternatively, after receiving the request message sent by the MME, the SGW may send delivery request information to the application server, to request the downlink data sent by the application server.

104: The MME sends the downlink data to the UE.

After receiving the downlink data, the MME sends the downlink data to the UE, so that the UE receives the downlink data and implements corresponding functions according to the downlink data.

The data transmission method provided in the embodiments of the present application includes: determining, by a mobility management entity MME, that user equipment UE changes from an unreachable state to a reachable state; sending, by the MME, a request message to a serving gateway SGW; receiving, by the MME, downlink data sent by the SGW; and sending, by the MME, the downlink data to the UE. In this way, when the UE changes to a reachable state for downlink data, the MME requests the SGW to send the downlink data, and the MME then sends the downlink data to the UE, thereby avoiding loss of the downlink data caused by delivery of the downlink data to the UE that is in an unreachable state, and improving real-time accuracy of transmission.

Figure 2:
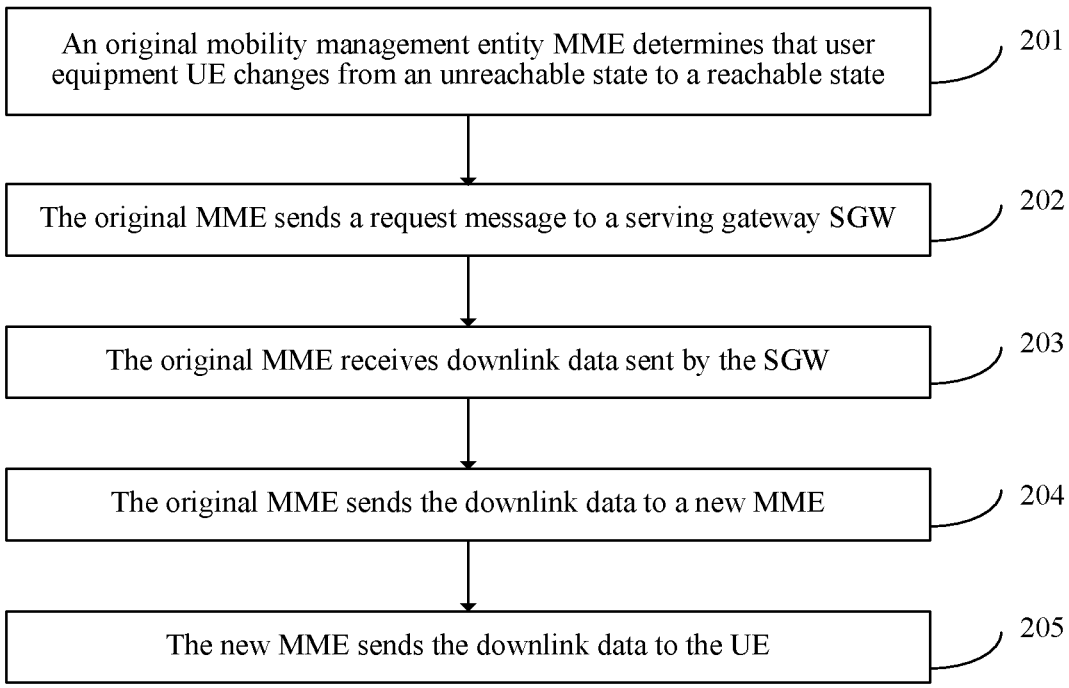
FIG. 2 is another schematic diagram of a data transmission method according to an embodiment of the present application.

Referring to FIG. 2, another embodiment of a data transmission method in the embodiments of the present application includes the following steps.

201: An original mobility management entity MME determines that user equipment UE changes from an unreachable state to a reachable state.

Because the user equipment UE may be a mobile device, when the UE moves, the UE may need to change an MME serving the UE, so as to ensure that the UE can normally communicate. Therefore, in this embodiment of the present application, the MIME includes an original MIME and a new MIME. The original MME is an MME serving the UE before the UE moves, and the new MME is an MME serving the UE after the UE moves. The original MME keeps serving the UE before the UE moves, and therefore, monitoring of a state of the UE is performed by the original MME.

In another implementation, the new MME may first obtain data information that is of the UE and that is stored by the original MIME, and the new MME monitors the state of the UE.

202: The original MME sends a request message to a serving gateway SGW.

In an optional implementation, when the original MME determines that the UE changes from an unreachable state to a reachable state, the original MIME first obtains downlink data to be sent to the UE. Therefore, the original MIME sends the request message to the SGW.

In another optional implementation, when the original MME serving the UE is switched to the new MIME, the new MIME directly establishes a connection to the SGW. Therefore, the new MIME may send the request message to the SGW. After receiving the downlink data, the new MIME may directly send the downlink data to the UE.

203: The original MIME receives the downlink data sent by the SGW.

Refer to S103 for detailed content.

204: The original MIME sends the downlink data to a new MME.

Because the MIME serving the UE is switched from the original MIME to the new MME, the original MIME can no longer send data information to the UE. Therefore, after receiving the downlink data sent by the SGW, the original MIME needs to send the downlink data to the new MME, and the new MME sends the downlink data to the UE.

205: The new MME sends the downlink data to the UE.

Refer to S104 for detailed content.

In this embodiment of the present application, when UE in an unreachable state moves and as a result the MIME serving the UE is switched from an original MIME to a new MME, one implementation is that the original MIME determines that the UE changes from an unreachable state to a reachable state, the original MME then obtains downlink data from an SGW, the original MME sends the downlink data to the new MIME, and eventually, the new MME sends the downlink data to the UE; the other implementation is that the new MME directly establishes a connection to the SGW, the new MME determines that UE changes from an unreachable state to a reachable state, and the new MIME obtains the downlink data from the SGW and then sends the downlink data to the UE. When the MME serving the UE changes, the downlink data can be sent to the UE in time in either of the foregoing implementations, thereby improving stability of data transmission.

Figure 3:
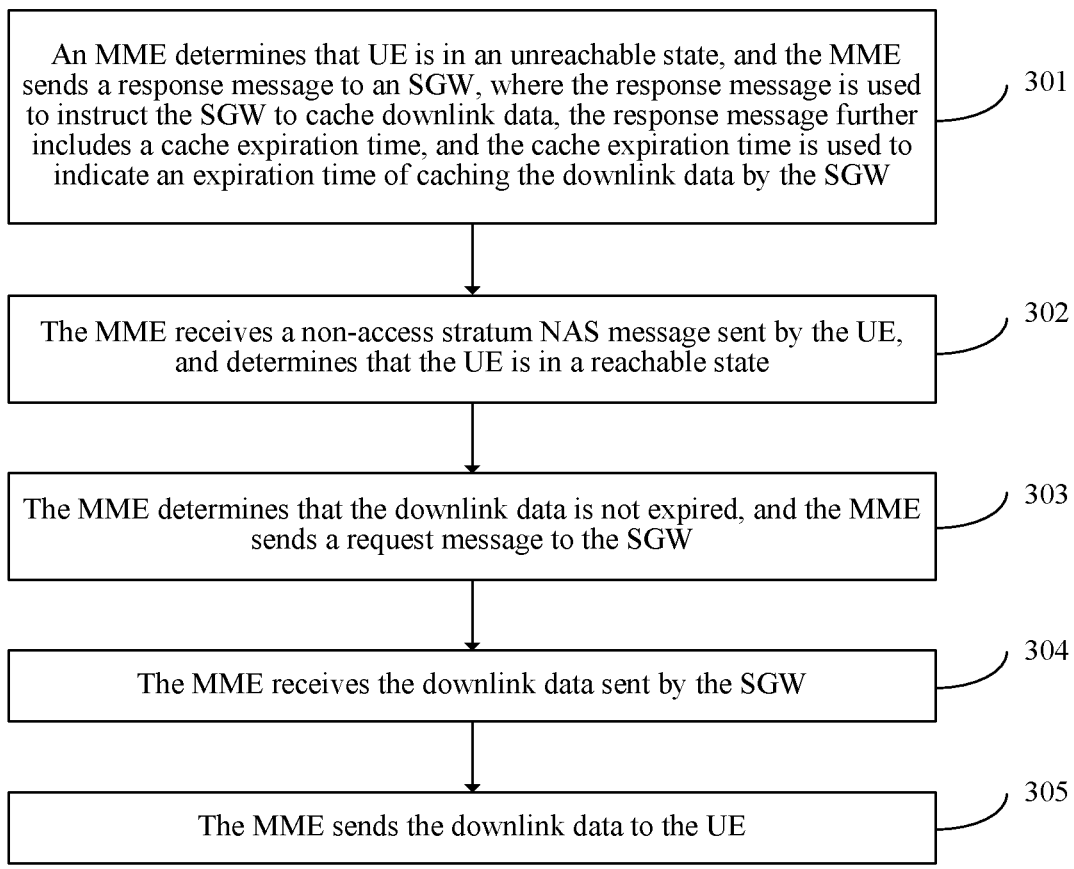
FIG. 3 is another schematic diagram of a data transmission method according to an embodiment of the present application.

Referring to FIG. 3, another embodiment of a data transmission method in the embodiments of the present application includes the following steps.

301: An MME determines that UE is in an unreachable state, and the MIME sends a response message to an SGW, where the response message is used to instruct the SGW to cache downlink data, the response message further includes a cache expiration time, and the cache expiration time is used to indicate an expiration time of caching the downlink data by the SGW.

Because the SGW cannot monitor a state of the UE, when the SGW receives downlink data sent by an application server, the SGW cannot send the downlink data to the UE in an unreachable state. Therefore, the SGW sends a downlink data notification message to the MIME, to indicate that the downlink data arrives and needs to be sent to the UE. The MIME determines that the UE is in an unreachable state. To prevent the downlink data from getting lost, the MIME sends a response message to the SGW, to instruct the SGW to cache the downlink data. If the UE stays in an unreachable state for an excessively long time, the downlink data may be inaccurate. In addition, the cache space of the SGW is limited. If the UE always stays in an unreachable state, when a network side sends a relatively large amount of downlink data to the SGW, the SGW cannot cache the large amount of downlink data. Therefore, the response message further includes a cache expiration time of the downlink data. When the downlink data is still not sent to the UE after a cache time of the downlink data ends, the SGW may discard the downlink data or may wait to receive new downlink data to replace the original downlink data.

302: The MME receives a non-access stratum NAS message sent by the UE, and determines that the UE is in a reachable state.

It is described in the foregoing embodiment that when the MIME detects that the UE changes from an unreachable state to a reachable state, the MIME actively obtains the downlink data and sends the downlink data to the UE. In this embodiment of the present application, when the UE changes from an unreachable state to a reachable state, the UE may first send the non-access stratum NAS message, for example, a tracking area update (TAU) message, to the MME, to indicate that the UE is in a reachable state.

Optionally, when the MIME determines that the UE changes to a reachable state, the MIME may page the UE. After receiving the paging sent by the MME, the UE may send a service request message to the MME, to update service data. Therefore, the MIME receives the service request message sent by the UE.

303: The MME determines that the downlink data is not expired, and the MME sends a request message to the SGW.

After the MME receives the service request message sent by the UE, because the downlink data is still cached in the SGW, the MIME needs to first send the request message to the SGW, to request the SGW to send the downlink data to the MME. To ensure that the downlink data is still cached in the SGW or determine that the downlink data is still valid, before sending the request message, the MIME needs to first determine that the downlink data is not expired.

304: The MME receives the downlink data sent by the SGW.

Refer to S103 for detailed content.

305: The MME sends the downlink data to the UE.

Refer to S104 for detailed content.

In this embodiment of the present application, when downlink data is delivered to an SGW, an MIME determines that the UE is in an unreachable state, and the MIME then sends a response message to the SGW to instruct the SGW to cache the downlink data, and set a cache expiration time. This avoids loss of the downlink data, and also ensures real-time accuracy of the downlink data. When the UE changes from an unreachable state to a reachable state, the UE sends a NAS message to the MIME, so that the MIME determines that the UE is in a reachable state, and the MIME obtains the downlink data from the SGW and then sends the downlink data to the UE. In this way, the UE receives the downlink data in time, and accuracy of data transmission is improved.

Figure 4:
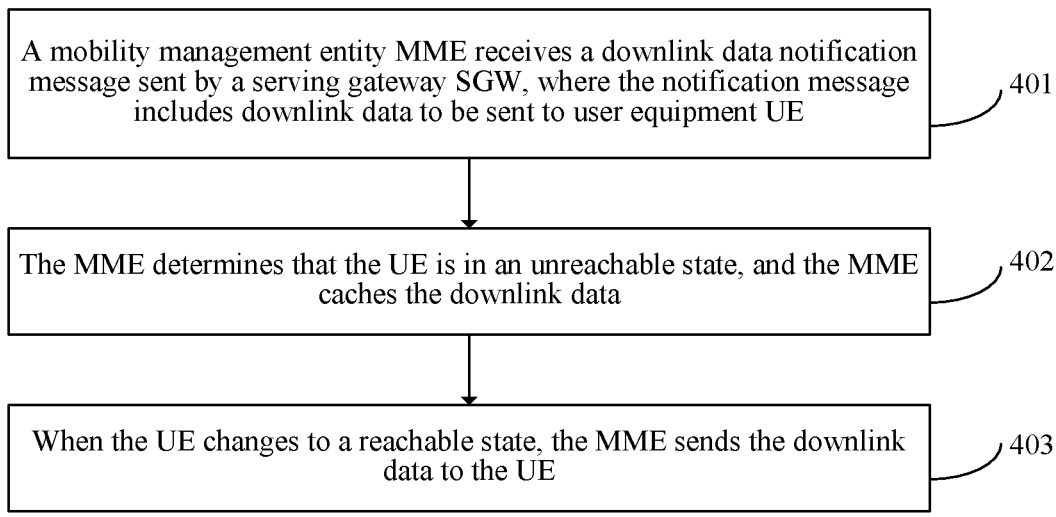
FIG. 4 is another schematic diagram of a data transmission method according to an embodiment of the present application.

Referring to FIG. 4, another embodiment of a data transmission method in the embodiments of the present application includes the following steps.

401: A mobility management entity MIME receives a downlink data notification message sent by a serving gateway SGW, where the notification message includes downlink data to be sent to user equipment UE.

When receiving the downlink data that is sent by an application server to the UE, the SGW finds that the UE cannot establish a connection to the SGW. In this case, the SGW sends the downlink data notification message to the MME, to indicate that downlink data to be sent to the UE arrives, and sends the downlink data to the MME by using the downlink data notification message.

402: The MME determines that the UE is in an unreachable state, and the MIME caches the downlink data.

When the MME receives the downlink data notification message and the downlink data, the MIME determines a state of the UE. When determining that the UE is in an unreachable state, the MME caches the downlink data, so that when the UE changes to a reachable state, the MIME may send the downlink data to the UE.

403: When the UE changes to a reachable state, the MIME sends the downlink data to the UE.

In this embodiment of the present application, when UE is in an unreachable state, an MIME receives downlink data sent by an SGW. To avoid loss of the downlink data, the MME caches the downlink data, so that when the UE changes to a reachable state, the MME sends the downlink data to the UE. In this way, the UE receives the downlink data in time, thereby improving real-timeliness of data transmission.

Figure 5:
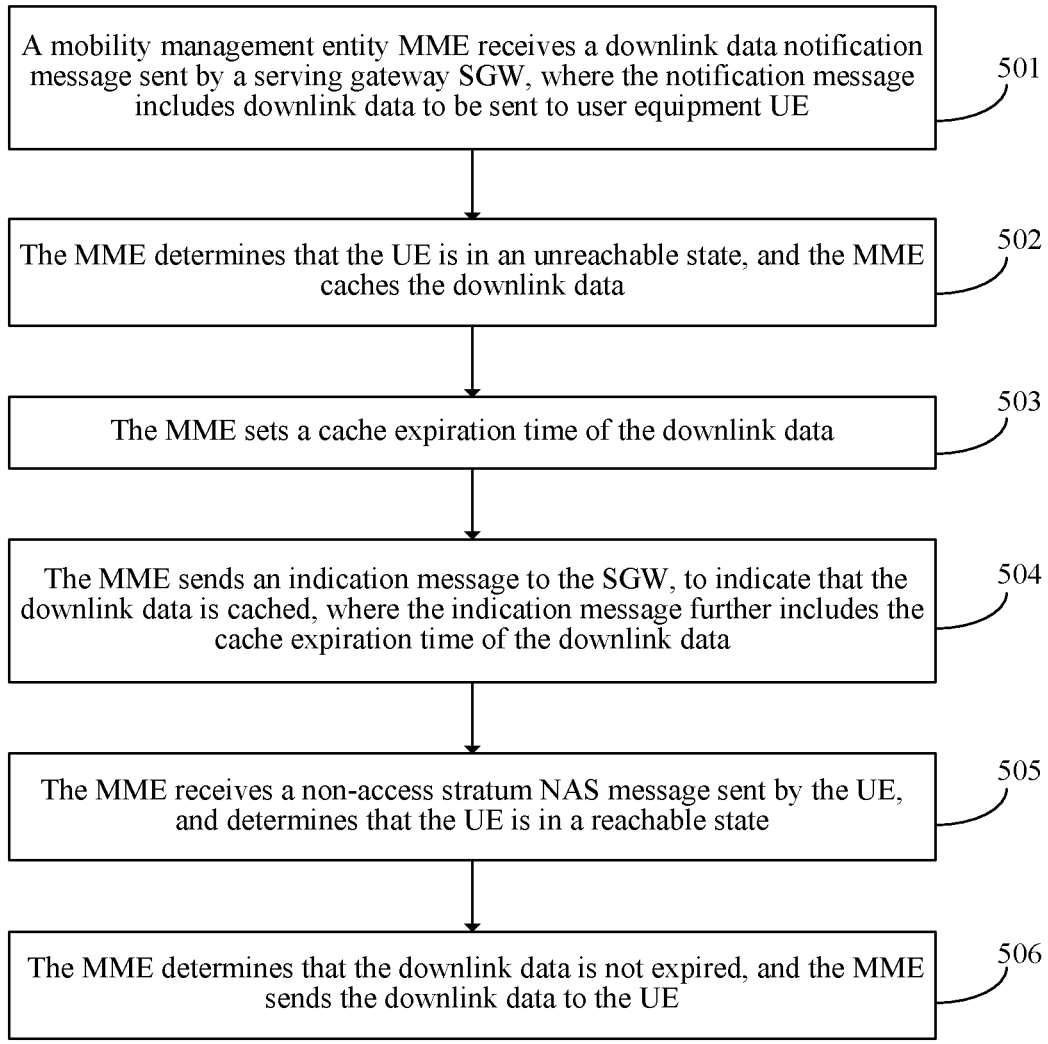
FIG. 5 is another schematic diagram of a data transmission method according to an embodiment of the present application.

Referring to FIG. 5, another embodiment of a data transmission method in the embodiments of the present application includes the following steps.

501: A mobility management entity MME receives a downlink data notification message sent by a serving gateway SGW, where the notification message includes downlink data to be sent to user equipment UE.

Refer to S401 for detailed content.

502: The MME determines that the UE is in an unreachable state, and the MIME caches the downlink data.

Refer to S402 for detailed content.

503: The MME sets a cache expiration time of the downlink data.

S301 in the embodiment of FIG. 3 describes that the SGW caches the downlink data and sets the cache expiration time of the downlink data. Similarly, in this embodiment of the present application, the MME may also cache the downlink data and set the cache expiration time of the downlink data.

504: The MME sends an indication message to the SGW, to indicate that the downlink data is cached, where the indication message further includes the cache expiration time of the downlink data.

It is described in S501 that when the SGW receives the downlink data, if the SGW cannot send the downlink data to the UE, the SGW sends a downlink data notification message to the MME. When the downlink data is cached in the MME, the cache expiration time of the downlink data is sent to the SGW by using the indication message. In this case, within the cache expiration time of the downlink data, when the SGW receives again downlink data sent by an application server, the SGW no longer needs to send the downlink data notification message to the MME. Because the downlink data is still cached in the MME, when the MME determines that the UE changes to a reachable state, the MME establishes a connection to the UE in time.

It should be noted that when the SGW receives downlink data sent by the application server again within the cache expiration time of the downlink data, the SGW may directly send the newly received downlink data to the MME, so that the MME caches the newly received downlink data. The SGW may also cache the newly received downlink data.

505: The MME receives a non-access stratum NAS message sent by the UE, and determines that the UE is in a reachable state.

Refer to S302 for detailed content.

506: The MME determines that the downlink data is not expired, and the MME sends the downlink data to the UE.

It should be noted that when the UE in an unreachable state moves, as a result, an MME serving the UE may change. Therefore, in this embodiment of the present application, the MME may include an original MME and a new MME. When the MME serving the UE is switched from the original MME to the new MME, the sending, by the MME, the downlink data to the UE includes: sending, by the original MME, the downlink data to the new MME; and sending, by the new MME, the downlink data to the UE.

In this embodiment of the present application, after receiving downlink data to be sent to UE, an SGW cannot directly send the downlink data to the UE, and the SGW then sends the downlink data to an MME. When determining that the UE is in an unreachable state, the MME caches the downlink data and sets a cache expiration time of the downlink data. In this way, real-timeliness of the downlink data is improved. When the UE changes to a reachable state, the UE sends a service request message to the MME, and the MME then determines whether the downlink data is expired. If the downlink data is not expired, the MME sends the downlink data to the UE, thereby improving real-timeliness of data transmission.

Figure 6:
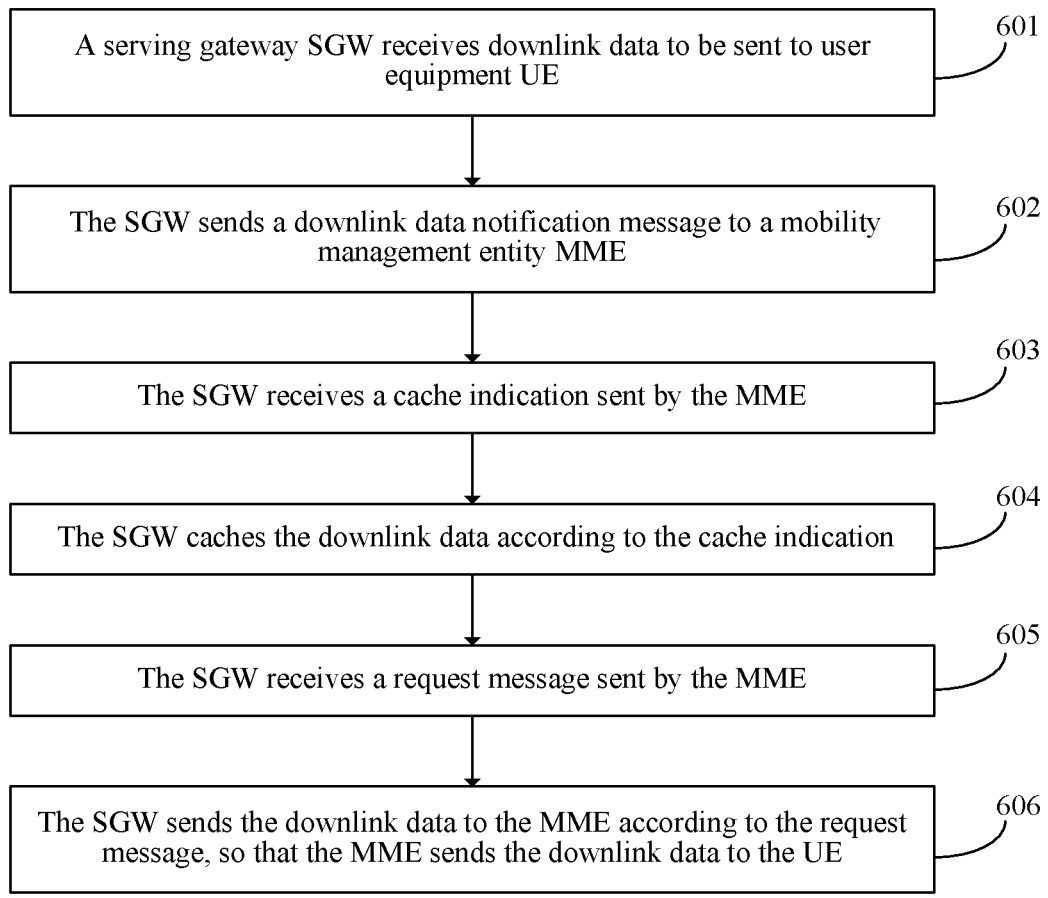
FIG. 6 is another schematic diagram of a data transmission method according to an embodiment of the present application.

Referring to FIG. 6, another embodiment of a data transmission method in the embodiments of the present application includes the following steps.

601: A serving gateway SGW receives downlink data to be sent to user equipment UE.

All downlink data sent by an application server to the UE needs to be forwarded by the SGW. Therefore, before the downlink data is sent to the UE, the SGW first receives the downlink data.

602: The SGW sends a downlink data notification message to a mobility management entity MME.

When receiving the downlink data that is sent by the application server to the UE, the SGW finds that the UE cannot establish a connection to the SGW. The SGW then sends the downlink data notification message to the MME, to indicate that the downlink data to be sent to the UE arrives.

603: The SGW receives a cache indication sent by the MME.

604: The SGW caches the downlink data according to the cache indication.

Optionally, the cache indication further includes a cache expiration time.

After the caching, by the SGW, the downlink data according to the cache indication, the method further includes:

setting, by the SGW, the cache expiration time of the downlink data according to the cache indication.

Refer to S301 for detailed content.

605: The SGW receives a request message sent by the MME.

606: The SGW sends the downlink data to the MME according to the request message, so that the MME sends the downlink data to the UE.

Refer to S303 for detailed content.

Figure 7:
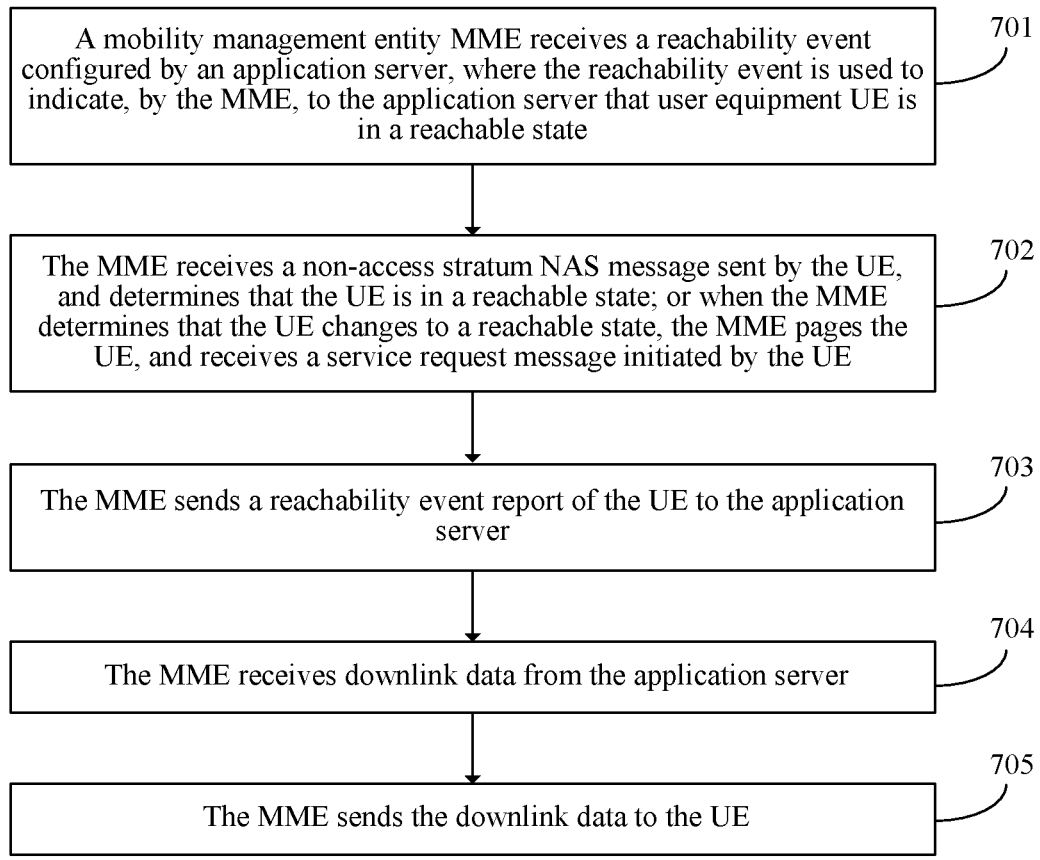
FIG. 7 is another schematic diagram of a data transmission method according to an embodiment of the present application.

Referring to FIG. 7, another embodiment of a data transmission method in the embodiments of the present application includes the following steps.

701: A mobility management entity MME receives a reachability event configured by an application server, where the reachability event is used to indicate, by the MIME, to the application server that user equipment UE is in a reachable state.

A meaning of an event as a computer term is: The event is an operation recognizable to a control, and is, for example, pressing an OK button or selecting a radio button or a check box. Each control has an event recognizable to the control. The event is, for example, a form loading event, a click event, a double-click event, and a text change event of an edit box (a text box).

It is described in all the foregoing embodiments that regardless of whether the UE is in a reachable state or an unreachable state, the application server first sends downlink data to an SGW. If the UE is in an unreachable state, first, the SGW caches the downlink data or the MIME caches the downlink data. When the UE changes to a reachable state, the MIME then sends the downlink data to the UE. However, in this embodiment of the present application, before sending the downlink data, the application server may first determine whether the UE is in a reachable state. When the UE is in a reachable state, the downlink data is then sent to the UE. Because the MIME has a function of monitoring the UE, the application server may first set the reachability event for the MME. When the MME determines that the UE is in a reachable state, the reachability event is triggered and it is indicated to the application server that the user equipment UE is in a reachable state.

702: The MME receives a non-access stratum NAS message sent by the UE, and determines that the UE is in a reachable state; or when the MIME determines that the UE changes to a reachable state, the MIME pages the UE, and receives a service request message initiated by the UE.

Refer to S302 for detailed content.

703: The MME sends a reachability event report of the UE to the application server.

When the MIME determines that the UE changes to a reachable state, the MIME sends the reachability event report of the UE to the application server, to indicate that the application server can send the downlink data to the UE.

704: The MME receives the downlink data from the application server.

Optionally, the MME receives, by using the serving gateway SGW, the downlink data sent by the application server. When the application server receives the reachability event report sent by the MIME, the application server can send the downlink data to the SGW. When receiving the downlink data, the SGW sends the downlink data to the MIME, so that the MME forwards the downlink data to the UE.

705: The MIME sends the downlink data to the UE.

In this embodiment of the present application, an application server sets a reachability event for an MIME. The MIME sends a reachability event report to the application server only when the MME determines that UE is in a reachable state, so that the application server sends downlink data to the UE. In this way, it is ensured that the downlink data is the most real-time data, and real-timeliness of data transmission is improved.

Figure 8:
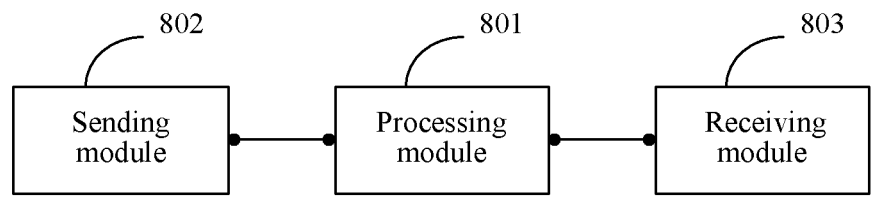
FIG. 8 is a schematic diagram of a mobility management entity MIME according to an embodiment of the present application.

Referring to FIG. 8, an embodiment of a mobility management entity MME in the embodiments of the present application includes a processing module 801, a sending module 802, and a receiving module 803.

The processing module 801, configured to determine that user equipment UE changes from an unreachable state to a reachable state.

Refer to S101 for detailed content.

The sending module 802 is configured to send a request message to a serving gateway SGW.

Refer to S102 for detailed content.

The receiving module 803 is configured to receive downlink data sent by the SGW.

Refer to S103 for detailed content.

The sending module 802 is further configured to send the downlink data to the UE.

Refer to S104 for detailed content.

Optionally, the MME includes an original MME and a new MIME, and when the original MME serving the UE is switched to the new MME, the sending module 802 is specifically configured for the original MIME, to send the request message to the SGW.

Refer to S202 for detailed content.

The receiving module 803 is specifically configured for the original MIME to receive the downlink data sent by the SGW.

Refer to S203 for detailed content.

The sending module 802 is further configured for the original MME to send the downlink data to the new MIME.

Refer to S204 for detailed content.

The sending module 802 is further configured for the new MME to send the downlink data to the UE.

Refer to S205 for detailed content.

Optionally, the MME includes an original MME and a new MME, and when the original MME serving the UE is switched to the new MME, the sending module 802 is specifically configured for the new MIME to send the request message to the SGW.

Refer to S202 for detailed content.

The receiving module 803 is specifically configured for the new MIME to receive the downlink data sent by the SGW.

The sending module 802 is further configured for the new MIME to send the downlink data to the UE.

Optionally, the processing module 801 is specifically configured to: when a non-access stratum NAS message sent by the UE is received, determine that the UE is in a reachable state.

Optionally, the sending module 802 is further configured to: before sending the request message to the SGW, when it is determined that the UE changes from an unreachable state to a reachable state, page the UE.

The receiving module 803 is further configured to receive a service request message sent by the UE.

Refer to S302 for detailed content.

Optionally, the sending module 802 is further configured to: before it is determined that the UE changes from an unreachable state to a reachable state, when it is determined that the UE is in an unreachable state, send a response message to the SGW, where the response message is used to instruct the SGW to cache the downlink data.

Optionally, the response message further includes a cache expiration time, and the cache expiration time is used to indicate an expiration time of caching the downlink data by the SGW.

Refer to S301 for detailed content.

Optionally, the sending module 802 is specifically further configured to: when it is determined that the downlink data is not expired, send the request message to the SGW.

Refer to S303 for detailed content.

Figure 9:
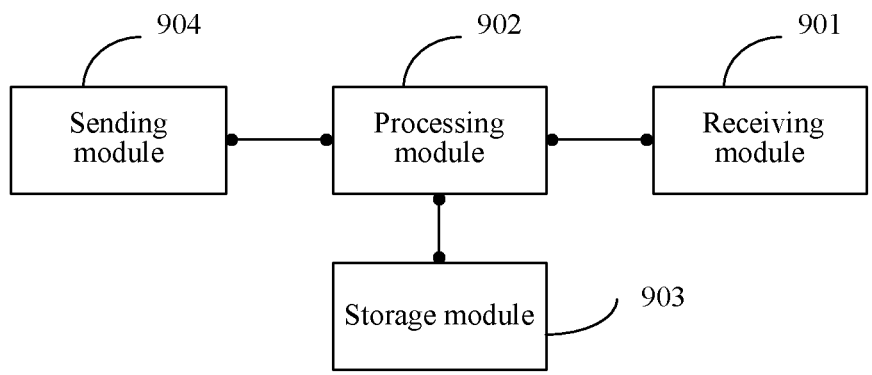
FIG. 9 is another schematic diagram of a mobility management entity MME according to an embodiment of the present application.

Referring to FIG. 9, another embodiment of a mobility management entity MME in the embodiments of the present application includes a receiving module 901, a processing module 902, a storage module 903, and a sending module 904.

The receiving module 901 is configured to receive a downlink data notification message sent by a serving gateway SGW, where the notification message includes downlink data sent to user equipment UE.

Refer to S401 for detailed content.

The processing module 902 is configured to determine that the UE is in an unreachable state.

The storage module 903 is configured to cache the downlink data when it is determined that the UE is in an unreachable state.

Refer to S402 for detailed content.

The sending module 904 is configured to send the downlink data to the UE when the UE changes to a reachable state.

Refer to S403 for detailed content.

Optionally, the processing module 902 is further configured to set a cache expiration time of the downlink data after the downlink data is cached.

Optionally, the sending module 904 is specifically configured to: when it is determined that the downlink data is not expired, send the downlink data to the UE.

Optionally, the MME includes an original MME and a new MME, and when the original MME serving the UE is switched to the new MME, the sending module 904 is specifically configured to:

for the original MIME, send the downlink data to the new MIME; and for the new MIME, send the downlink data to the UE.

Refer to S506 for detailed content.

Optionally, the processing module 902 is specifically configured to:

when a non-access stratum NAS message sent by the UE is received, determine that the UE is in a reachable state.

Refer to S505 for detailed content.

Optionally, the sending module 904 is further configured for the MME to: before the downlink data is sent to the UE, when it is determined that the UE changes to a reachable state, page the UE.

The receiving module 901 is further configured to receive a service request message sent by the UE.

Optionally, the sending module 904 is further configured to: after the downlink data is cached, send an indication message to the SGW, to indicate that the downlink data is cached.

Optionally, the indication message further includes a cache expiration time of the downlink data.

Refer to S504 for detailed content.

Figure 10:
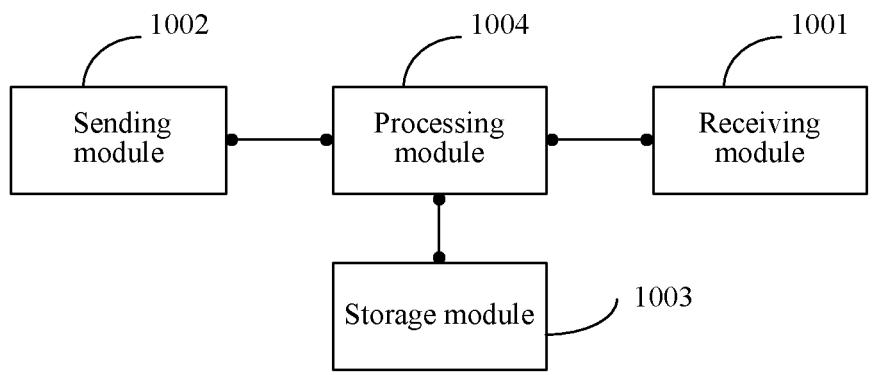
FIG. 10 is a schematic diagram of a serving gateway SGW according to an embodiment of the present application.

Referring to FIG. 10, an embodiment of a serving gateway SGW in the embodiments of the present application includes a receiving module 1001, a sending module 1002, a storage module 1003, and a processing module 1004.

The receiving module 1001 is configured to receive downlink data sent to user equipment UE.

Refer to S601 for detailed content.

The sending module 1002 is configured to send a downlink data notification message to a mobility management entity MIME.

Refer to S602 for detailed content.

The receiving module 1001 is further configured to receive a cache indication sent by the MME.

The storage module 1003 is configured to cache the downlink data according to the cache indication.

Refer to S604 for detailed content.

The receiving module 1001 is further configured to receive a request message sent by the MME.

The sending module 1002 is further configured to send the downlink data to the MME according to the request message, so that the MIME sends the downlink data to the UE.

Refer to S606 for detailed content.

The processing module 1004 is configured to instruct the storage module 1003 to cache the downlink data.

Optionally, the cache indication further includes a cache expiration time.

The processing module 1004 is further configured to: set a cache expiration time of the downlink data according to the cache indication after the downlink data is cached according to the cache indication.

Refer to S604 for detailed content.

Figure 11:
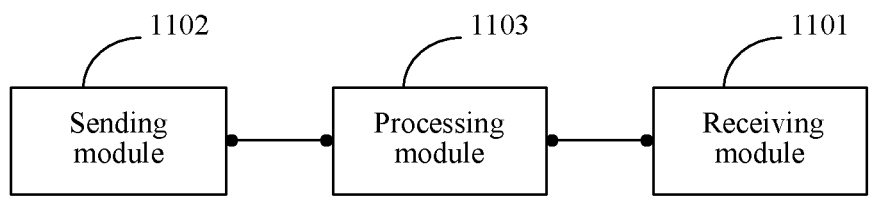
FIG. 11 is another schematic diagram of a mobility management entity MIME according to an embodiment of the present application.

Referring to FIG. 11, another embodiment of a mobility management entity MME in the embodiments of the present application includes a receiving module 1101, a sending module 1102, and a processing module 1103.

The receiving module 1101 is configured to receive a reachability event configured by an application server, where the reachability event is used to indicate, by the MME, to the application server that user equipment UE is in a reachable state.

Refer to S701 for detailed content.

The receiving module 1101 is further configured to: receive a non-access stratum NAS message sent by the UE, and determine that the UE is in a reachable state; or when it is determined that the UE changes to a reachable state, page the UE, and receive a service request message initiated by the UE.

Refer to S702 for detailed content.

The sending module 1102 is configured to send a reachability event report of the UE to the application server.

Refer to S703 for detailed content.

The receiving module 1101 is further configured to receive downlink data from the application server.

Refer to S704 for detailed content.

The sending module 1102 is further configured to send the downlink data to the UE.

Refer to S705 for detailed content.

The processing module 1103 is configured to determine a state of the UE.

Optionally, the receiving module 1101 is specifically configured to: receive, by using a serving gateway SGW, the downlink data sent by the application server.

Refer to S704 for detailed content.

Figure 12:
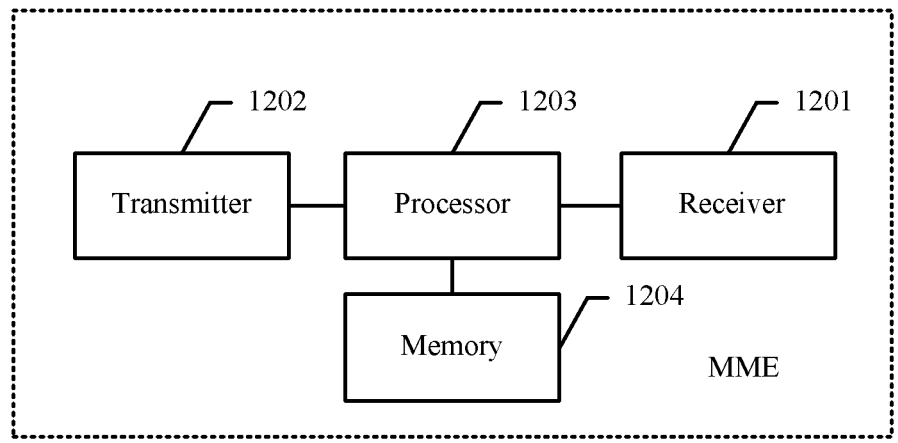
FIG. 12 is another schematic diagram of a mobility management entity MME according to an embodiment of the present application.

FIG. 12 is another schematic structural diagram of a mobility management entity MME according to an embodiment of the present application. The MME may include at least one receiver 1201, at least one transmitter 1202, at least one processor 1203, and a memory 1204.

The MME involved in this embodiment of the present application may include more or fewer components than those shown in FIG. 12, may combine two or more components, or may have different configurations or arrangements of components, where the components may be implemented in hardware, software, or a combination of hardware or software that includes one or more signal-processing and/or application-specific integrated circuits.

Specifically, the transmitter 1202 may implement functions of the sending module 802 in the embodiment of FIG. 8, the sending module 904 in the embodiment of FIG. 9, and the sending module 1102 in the embodiment of FIG. 11.

The receiver 1201 may implement functions of the receiving module 803 in the embodiment of FIG. 8, the receiving module 901 in the embodiment of FIG. 9, and the receiving module 1101 in the embodiment of FIG. 11.

The processor 1203 may implement functions of the processing module 801 in the embodiment of FIG. 8, the processing module 902 in the embodiment of FIG. 9, and the processing module 1103 in the embodiment of FIG. 11.

The memory 1204 may implement functions of the storage module 903 in the embodiment of FIG. 9.

Figure 13:
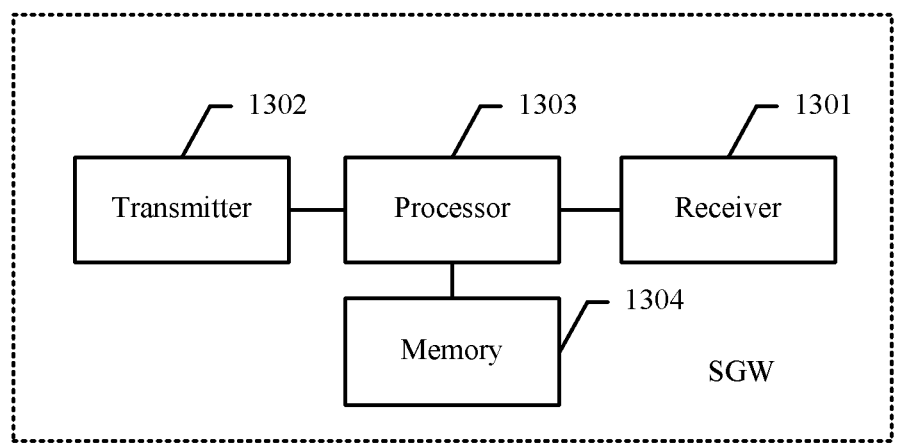
FIG. 13 is another schematic diagram of a serving gateway SGW according to an embodiment of the present application.

FIG. 13 is another schematic structural diagram of a serving gateway SGW according to an embodiment of the present application. The SGW may include at least one receiver 1301, at least one transmitter 1302, at least one processor 1303, and a memory 1304.

The SGW involved in this embodiment of the present application may include more or fewer components than those shown in FIG. 13, may combine two or more components, or may have different configurations or arrangements of components, where the components may be implemented in hardware, software, or a combination of hardware or software that includes one or more signal-processing and/or application-specific integrated circuits.

Specifically, the transmitter 1302 may implement functions of the sending module 1002 in the embodiment of FIG. 10.

The receiver 1301 may implement functions of the receiving module 1001 in the embodiment of FIG. 10.

The processor 1303 may implement functions of the processing module 1004 in the embodiment of FIG. 10.

The memory 1304 may implement functions of the storage module 1003 in the embodiment of FIG. 10.

The foregoing embodiments are merely intended for describing the technical solutions of the present application, but not for limiting the present application. Although the present application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A data transmission method, comprising:
    determining, by a mobility management entity, that user equipment (UE) has changed from an unreachable state to a reachable state;
    determining, by the mobility management entity, that a serving gateway has downlink data for the UE and the downlink data has not expired;
    sending, by the mobility management entity, a request message to the serving gateway to request the serving gateway to send the downlink data to the mobility management entity;
    sending, by the serving gateway according to the request message, the downlink data to the mobility management entity;
    receiving, by the mobility management entity, the downlink data; and
    sending, by the mobility management entity, the downlink data to the UE.

2. The method according to claim 1, further comprising:
    receiving, by the mobility management entity, a non-access stratum (NAS) message from the UE, wherein the step of determining determines that the UE has changed to the reachable state according to the NAS message.

3. The method according to claim 2, wherein the NAS message is a tracking area update (TAU) message.

4. The method according to claim 1, wherein prior to the step of determining, the method further comprises:
    receiving, by the serving gateway, the downlink data;
    sending, by the serving gateway, a downlink data notification message to the mobility management entity;
    determining, by the mobility management entity, that the UE is in the unreachable state; and
    sending, by the mobility management entity, a response message to the serving gateway to instruct the serving gateway to cache the downlink data.

5. The method according to claim 4, wherein the response message comprises a cache expiration time indicating an expiration time for caching the downlink data by the serving gateway; the method further comprises:
    setting, by the serving gateway, a cache expiration time of the downlink data based on the cache expiration time in the response message.

6. A non-transitory computer-readable medium storing computer instructions, that when executed by a processor of a mobility management entity in a communication network, cause the processor to perform steps of:
    determining that user equipment (UE) has changed from an unreachable state to a reachable state;
    determining that a serving gateway has downlink data for the UE and the downlink data has not expired;
    sending a request message to the serving gateway to request the serving gateway to send the downlink data to a mobility management entity;
    receiving the downlink data from the serving gateway; and
    sending the downlink data to the UE.

7. The non-transitory computer-readable medium according to claim 6, wherein the computer instructions further cause the processor to perform the step:
    receiving a non-access stratum (NAS) message from the UE, wherein the step of determining determines that the UE has changed to the reachable state according to the NAS message.

8. The non-transitory computer-readable medium according to claim 7, wherein the NAS message is a tracking area update (TAU) message.

9. The non-transitory computer-readable medium according to claim 6, wherein prior to the step of determining, the computer instructions further cause the processor to perform the steps:
    determining that the UE is in the unreachable state; and
    sending a response message to the serving gateway to instruct the serving gateway to cache the downlink data.

10. The non-transitory computer-readable medium according to claim 9, wherein the response message comprises a cache expiration time indicating an expiration time for caching the downlink data by the serving gateway.

11. An apparatus comprising:
    a memory storing executable instructions; and
    a processor in communication with the memory and being configured to execute the executable instructions to:
        determine that user equipment (UE) has changed from an unreachable state to a reachable state;
        determine that a serving gateway has downlink data for the UE and the downlink data has not expired;

send a request message to the serving gateway to request the serving gateway to send the downlink data to a mobility management entity;

receive the downlink data from the serving gateway; and send the downlink data to the UE.

12. The apparatus according to claim 11, wherein the processor is further configured to receive a non-access stratum (NAS) message from the UE, and wherein the processor determines that the UE has changed from the unreachable state to the reachable state according to the NAS message.

13. The apparatus according to claim 12, wherein the NAS message is a tracking area update (TAU) message.

14. The apparatus according to claim 11, wherein before determining that the UE has changed from the unreachable state to the reachable state, the processor is further configured to:

determine that the UE is in the unreachable state, and send a response message to the serving gateway to instruct the serving gateway to cache the downlink data.

15. The apparatus according to claim 14, wherein the response message comprises a cache expiration time indicating an expiration time for caching the downlink data by the serving gateway.

* * * * *